(12) United States Patent
Foltzer

(10) Patent No.: US 6,868,233 B2
(45) Date of Patent: Mar. 15, 2005

(54) WAVELENGTH AGILE OPTICAL TRANSPONDER FOR BI-DIRECTIONAL, SINGLE FIBER WDM SYSTEM TESTING

(75) Inventor: Lawrence E. Foltzer, Occidential, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 599 days.

(21) Appl. No.: 09/737,361

(22) Filed: Dec. 14, 2000

(65) Prior Publication Data

US 2003/0035615 A1 Feb. 20, 2003

(51) Int. Cl.[7] .............................................. H04B 10/08
(52) U.S. Cl. ............................ 398/16; 398/12; 398/23; 398/34
(58) Field of Search ........................... 398/12, 16, 31, 398/33, 22, 34; 385/24, 47

(56) References Cited

U.S. PATENT DOCUMENTS

| | | | | |
|---|---|---|---|---|
| 4,882,771 A | * | 11/1989 | Rocks .......................... 398/168 |
| 4,994,675 A | * | 2/1991 | Levin et al. ................. 250/551 |
| 5,479,547 A | * | 12/1995 | Kunikane et al. ............. 385/47 |
| 5,491,572 A | * | 2/1996 | Ohara ........................... 398/15 |
| 5,510,917 A | * | 4/1996 | Corke et al. .................. 398/34 |
| 5,694,234 A | * | 12/1997 | Darcie et al. ................. 398/72 |
| 5,712,936 A | * | 1/1998 | Hoag et al. .................... 385/24 |
| 5,864,413 A | * | 1/1999 | Feldman et al. ............. 398/72 |
| 5,969,836 A | | 10/1999 | Foltzer ...................... 359/114 |

OTHER PUBLICATIONS

"Passive Optical Network (PON) Systems"; 3 pages; Oct. 29, 2000. [www.swt.iao.fhg.de/eurorim/guidelines/siig2/architectures22].

* cited by examiner

Primary Examiner—M. R. Sedighian
Assistant Examiner—Dzung Tran
(74) Attorney, Agent, or Firm—Danamraj & Youst; Richard A. Mysliwiec; Jessica W. Smith

(57) ABSTRACT

A wavelength agile optical transponder system and method for testing a fiber optic link formed of a single fiber. An optical source coupled to the optic link provides a signal at a first wavelength which is propagated towards a wavelength division multiplex (WDM) coupler disposed on the optic link. Upon receiving the optical signal by a receiver, an optical cross-connect arrangement is utilized for transmitting the optical signal after translating its wavelength into a second wavelength. By evaluating the optical signal in the optical loop-back thus effectuated, the path integrity of the optic link is determined without having to know the wavelength of the incident signal or direction of transmission.

29 Claims, 3 Drawing Sheets

WAVELENGTH AGILE OPTICAL TRANSPONDER FOR BI-DIRECTIONAL, SINGLE FIBER WDM SYSTEM TESTING

This application discloses subject matter related to the subject matter disclosed in the following commonly owned co-pending patent applications: (i) "Wide Tuning Range Fiber Bragg Grating Filter (FBGF) Using Muscle Wire," filed Dec. 28, 1999, application Ser. No. 09/473,754, in the name(s) of: Lawrence E. Foltzer, (ii) "Wide Tuning Range Acousto-Optical Fiber Bragg Grating Filter (FBGF)," filed Jul. 17, 2000, application Ser. No. 09/617,576, in the name (s) of: Lawrence F. Foltzer; and (iii) "Multi-Channel, Multi-Mode Redundant Optical Local Loop Having A Bus Topology," filed Dec. 15, 2000, application Ser. No. 09/738,223, in the name(s) of: Lawrence E. Foltzer.

BACKGROUND OF THE INVENTION

1. Technical Field of the Invention

The present invention relates to techniques for testing optical links involving wavelength division multiplex (WDM) systems. More particularly, and not by way of any limitation, the present invention is directed to a wavelength adaptive or agile optical transponder for testing a bi-directional, single-fiber optical link using a WDM system.

2. Description of Related Art

As networks face increasing bandwidth demand and diminishing fiber availability in the existing fiber plant, network providers are migrating towards a new network technology called the optical network. Optical networks are high-capacity telecommunications networks comprised of optical and opto-electronic technologies and components, and provide wavelength-based services in addition to signal routing, grooming, and restoration at the wavelength level. These networks, based on the emergence of the so-called optical layer operating entirely in the optical domain in transport networks, can not only support extraordinary capacity (up to terabits per second (Tbps)), but also provide reduced costs for bandwidth-intensive applications such as the Internet, interactive video-on-demand and multimedia, and advanced digital services.

Of the several key enabling technologies necessary for the successful deployment of optical networks, wavelength division multiplexing (WDM) has emerged as a crucial component for facilitating the transmission of diverse payloads regardless of their bit-rate and format over the optical layer. WDM increases the capacity of embedded fiber by first assigning incoming optical signals to specific wavelengths within a designated frequency band (i.e., channels separated by a predetermined spacing) and then multiplexing the resulting signals out onto a single fiber. Because incoming signals are not terminated in the optical layer, the interface is bit-rate and format independent, allowing service/network providers to integrate the WDM technology with existing equipment in the network.

By combining multiple optical signals using WDM, they can be amplified as a group and transported over a single fiber to increase capacity in a cost-effective manner. Each signal carried can be at a different transmission rate (e.g., Optical Carrier (OC)-3, OC-12, OC-48, etc.) and in a different format (e.g., Synchronous Optical Network (SONET) and its compani22on Synchronous Digital Hierarchy (SDH), Asynchronous Transfer Mode (ATM), Internet Protocol (IP)-based data or multimedia, et cetera).

Current advances in WDM technologies allow a plurality of wavelengths to be multiplexed over a fiber using nanometer and sub-nanometer spacing (Dense WDM or DWDM). For example, up to 32 channels or carriers may be spaced 100 GHz apart (equal to 0.8 nm) in a multiplexed optical signal operating in a particular transmission band. In contrast, some of the standardized, "coarse" wavelength separations include 200 GHz spacing (1.6 nm) and 400 GHz spacing (3.2 nm).

In a typical implementation of an optical link, usually a single optic fiber is deployed between two end points, e.g., an optical network unit or ONU and a head end located at an end office. The optical link is operable to carry both upstream and downstream signals within separate transmission bands of the single optic fiber in order to avoid signal conflicts, crosstalk and the like. This practice is generally referred to as broadband WDM.

Optic fibers composed of silica have three useful transmission bands located at about 850, 1310 and 1550 nm, which may be referred to as the 850 band, the 1310 band and the 1550 band. The existence of these bands is partly a function of the characteristics of the fiber itself, including such factors as the amount of optical absorption and dispersion within the fiber at different wavelengths, and partly a function of practical limitations on the availability of suitable devices, such as lasers and LEDs, used for coupling light into the fiber at different wavelengths.

As deploying optical links with WDM transmission capabilities has become prevalent, various techniques for testing such links in an efficient manner are being developed. Whereas several techniques for testing the optical link are currently available, the existing solutions are beset with various deficiencies and shortcomings.

For example, several wavelength-specific optical transponders are typically required for monitoring the path/performance integrity of an optical link capable of transmitting multiple wavelengths on a single fiber. In addition, it is often necessary for a technician to know beforehand the wavelength of the incident optical signal used.

Moreover, the current techniques do not provide for automatic rate adaption with respect to the multiple transmission rates available on optical links today. Typically, a plurality of devices are used for testing the link at different transmission rates. Further, a priori knowledge regarding the directionality of transmission is assumed where bi-directional transmission of the optical signals is employed.

Based upon the foregoing, it should be apparent that there has arisen an acute need for a system and method for testing an optical link, particularly a link formed of a bi-directional single fiber system involving WDM transmission, that overcomes these and other deficiencies and drawbacks in an efficient manner.

SUMMARY OF THE INVENTION

Accordingly, the present invention advantageously provides a wavelength agile (i.e., agnostic or adaptive to various signal wavelengths) optical transponder system and method for testing a fiber optic link formed of a bi-directional, single fiber. An optical source coupled to the optic link provides an incident signal at a first wavelength which is propagated towards a wavelength division multiplex (WDM) coupler disposed on the optic link. Upon receiving the optical signal by a receiver, an optical cross-connect arrangement is utilized for transmitting back the optical signal after translating its wavelength into a second wavelength. By evaluating the optical signal in the optical loop-back thus effectuated, the path integrity of the optic link is determined without having to know the wavelength of the incident signal or direction of transmission.

In one exemplary embodiment, the wavelengths of the optical signals are operable in the 1310 nm and 1550 nm bands. Thus, when the received signal is operable in the 1310 band, the loop-back transmitted signal is sent in the 1550 band. Similarly, the received signal in the 1550 band is transmitted back at in the 1310 band. Preferably, a microprocessor/microcontroller is utilized for controlling wavelength translation, enabling appropriate transmitter, et cetera, in addition to managing various displays (e.g., receive power level, incident signal's wavelength ranges and the like) and controlling transmitter output power levels. The optical transponder is also rate-adaptive, providing for transparent loop-back at several transmission rates such as, e.g., Optical Carrier (OC)-3, OC-12, OC-48 rates.

In one aspect, the present invention is directed to an optical transponder system for testing a fiber optic link. At least one optical source is operably coupled to the fiber optic link for emanating an optical signal at a first wavelength. A WDM coupler is disposed on the fiber optic link for multiplexing and de-multiplexing optical signals operating at a plurality of wavelengths. An optical cross-connect portion is coupled to the WDM coupler for facilitating the provision of the optical signal received by a receiver at the first wavelength to a transmitter operable for transmitting the optical signal at a second wavelength via an optical loop-back. The optical cross-connect portion is preferably implemented using one or more optical power splitters operable to provide receiver and transmitter ports at the required wavelengths.

In another aspect, the present invention is directed to a method of testing an optical link formed of a bi-directional single fiber. An optical signal operable at a first wavelength is generated by an optical source disposed on the optical link. The optical signal is propagated on the optical link toward a WDM coupler which is coupled to an optical cross-connect arrangement. Upon receiving the optical signal by a receiver facilitated via the optical cross-connect arrangement, a suitable wavelength translation process is performed with respect to the received optical signal. Other signal processing operations (grooming, shaping, power adjustment, etc.) may also be implemented based on design objectives. Preferably, a microprocessor or other control logic (e.g., programmable controllers, programmable logic devices, etc.) may be utilized for effectuating such operations. Thereafter, the optical signal is provided to a transmitter operating at a second wavelength for effectuating an optical loop-back. Path integrity of the optical link is monitored by evaluating the optical signal in the optical loop-back. Incident signal's wavelength range, receive level display, output level control, etc. may also be monitored based on the performance objectives of a particular implementation.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
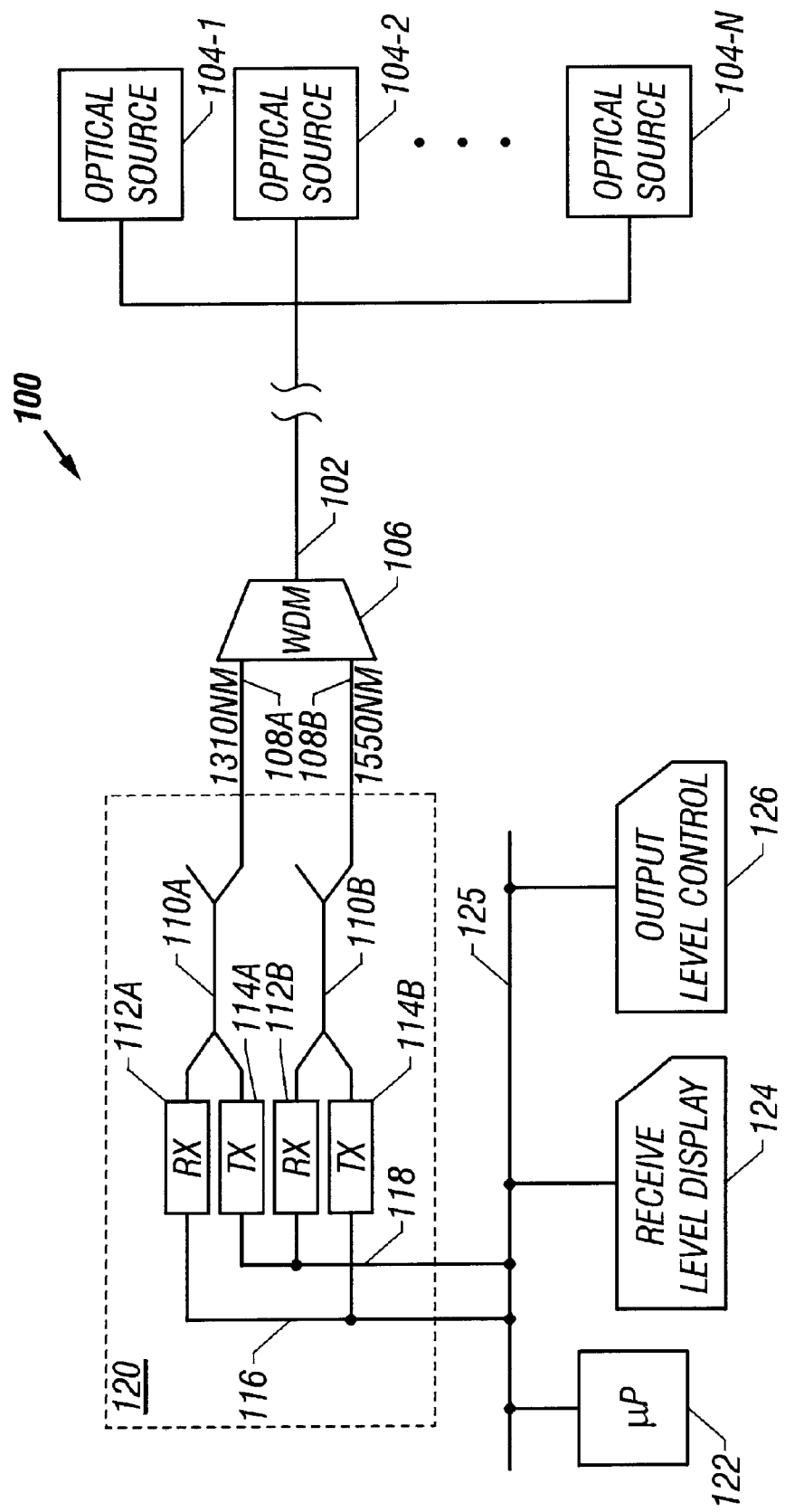
FIG. 1 depicts an exemplary embodiment of a wavelength agile optical transponder system for testing bi-directional single-fiber WDM systems in accordance with the teachings of the present invention.

In the drawings, like or similar elements are designated with identical reference numerals throughout the several views thereof, and the various elements depicted are not necessarily drawn to scale. Referring now to FIG. 1, depicted therein is an exemplary embodiment of a wavelength agile optical transponder system 100 for testing a bi-directional, single-fiber optical link 102 in accordance with the teachings of the present invention. In the exemplary embodiment depicted, a WDM coupler 106 is coupled to the optical link 102 for multiplexing and de-multiplexing optical signals of multiple wavelengths operable in different transmission bands, e.g., 1310 nm and 1550 nm bands.

One or more optical sources (reference numerals 104-1 through 104-N) operable to generate optical signals at different wavelengths are coupled to the optical link as an incident signal source. Those skilled in the art should realize upon reference hereto that at least a portion of these optical sources may be tunable in some exemplary embodiments. In further embodiments, a single tunable optical source may be provided instead as the incident signal source. Irrespective of the number of optical sources and wavelengths of the incident signals emanating therefrom, the sources are also preferably capable of operating at various optical transmission rates such as, e.g., Optical Carrier (OC)-3, OC-12, OC-48 rates.

Continuing to refer to the exemplary embodiment shown in FIG. 1, the WDM coupler 106 couples to a first optical path 108A operable at a first wavelength (e.g., operable at about 1310 nm) and a second optical path 108B operable at a second wavelength (e.g, operable at about 1550 nm) for multiplexing and de-multiplexing the optical signals on to and from the single-fiber optical link 102. An optical cross-connect portion 120 is advantageously provided for facilitating an optical loop-back path for the incident signals in order to effectuate path integrity monitoring. A first optical power splitter 110A disposed in the cross-connect portion 120 is coupled to the first optical path 108A for providing receive and transmit ports to which a receiver-transmitter pair operable at the first wavelength are coupled. In similar fashion, a second optical power splitter 110B is provided in the optical cross-connect portion 120 for coupling with the second optical path 108B in order to facilitate the another set of receive and transmit ports. Accordingly, receiver 112A and transmitter 114A operable with the 1310 nm band and receiver 112B and transmitter 114B operable with the 1550 nm band are exemplified in the optical cross-connect portion 120 of the optical transponder system 100.

Optical loop-back functionality is effectuated by providing the incident signal received by a particular receiver at one wavelength to a transmitter of different wavelength by means of cross-connect mapping. Preferably, a control entity 122 implemented as a microprocessor/microcontroller or suitable programmable logic and the like is provided for controlling optical signal processing, such as wavelength translation, shaping, grooming, power adjustment, etc., with respect to the received incident optical signals in conjunction with the provision of such signals to the cross-connected transmitters.

Signal path 116 of the cross-connect is operable to provide a pathway for delivering the received optical signals at 1310 nm to the transmitter 114B under the control of the microprocessor 122. Analogously, signal path 118 is operable to provide a pathway for delivering the received optical signals at 1550 nm to the transmitter 114A also under the control of the microprocessor 122. Additional functionality of the optical transponder system includes, by way of example, monitoring and displaying receive signal power levels, selectable control of transmitter output levels, displaying wavelength ranges of the incident signal, etc. A suitable bus 125 is provided for interconnecting the various opto-electronic components, e.g., display 124 and output level control 126.

In a presently preferred exemplary embodiment, one or more 3 dB power splitters are used for providing access ports for the receivers and transmitters disposed in the optical cross-connect arrangement in accordance herewith. Whereas only two splitter-couplers have been described, it should be realized that a more elaborate cross-connect mapping configuration may be achieved using additional splitter elements in order to accommodate more than two wavelengths. Wavelength translation for the appropriate channel pair is maintained under the control entity 122 which monitors the activity of the receivers and subsequently enables the appropriate transmitter when its complementary wavelength receiver has detected a valid signal. By effectuating the optical loop-back on any selected pair of complementary wavelengths, the path integrity of the optical link 102 is monitored by evaluating the incident and reflected signals via appropriate means.

Figure 2:
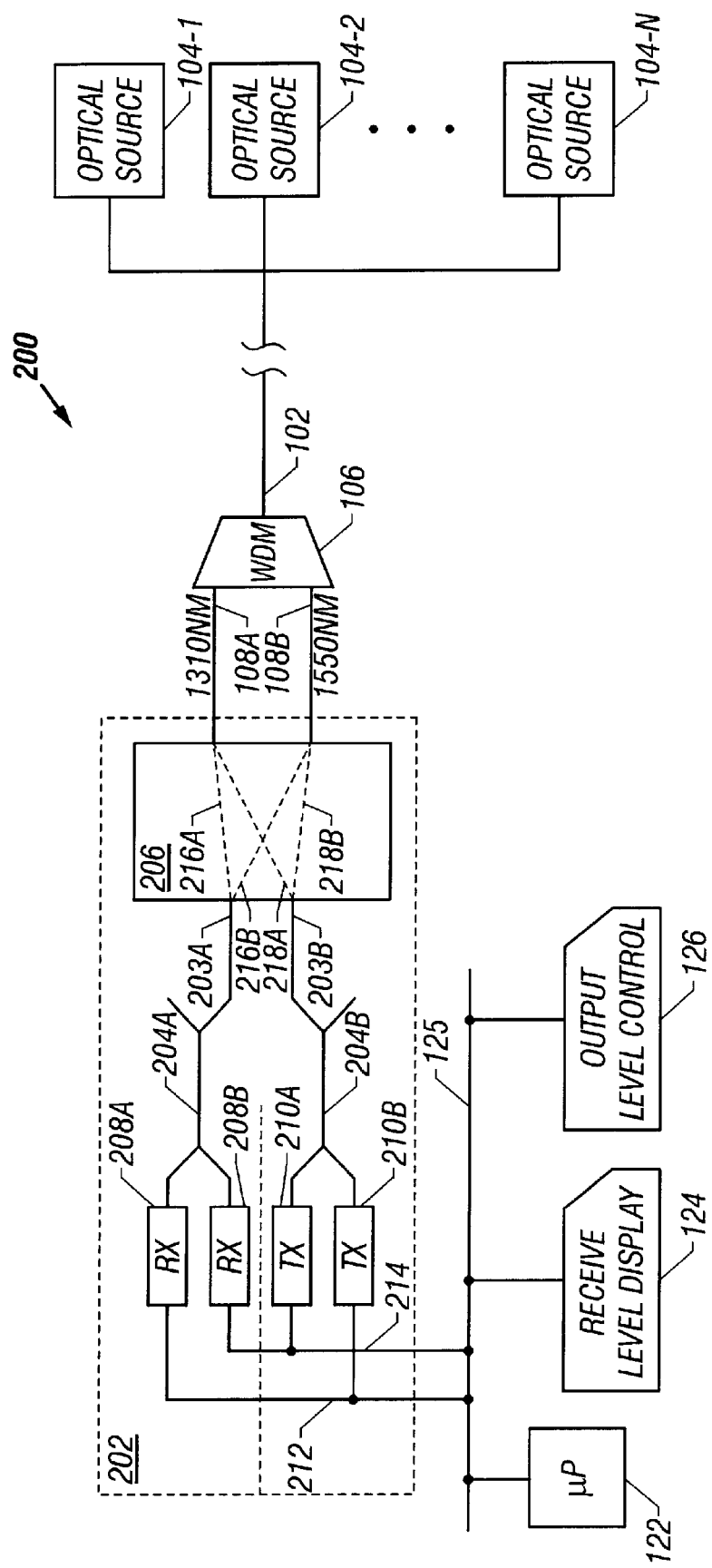
FIG. 2 depicts another exemplary embodiment of a wavelength agile optical transponder system for testing bi-directional single-fiber WDM systems in accordance with the teachings of the present invention.

Referring now to FIG. 2, depicted therein is another exemplary embodiment of a wavelength agile optical transponder system 200 for testing bi-directional, single-fiber WDM systems in accordance with the teachings of the present invention. Those skilled in the art should readily recognize that the transponder system 200 is similar in many ways to the transponder system embodiment 100 described in detail hereinabove. Accordingly, only some of the salient features of the transponder system 200 are set forth hereinbelow.

An optical cross-connect configuration 202 coupled to the embedded WDM coupler 106 includes a wavelength cross-mapping scheme 206 wherein multi-wavelength pathways 203A and 203B are cross-mapped to carry both wavelengths operable with the WDM coupler. Each multi-wavelength pathway is operable either in receive mode or in transmit mode and is coupled to a suitable wavelength separator/coupler for effectuating multiple receive or transmit ports. Accordingly, the receive and transmit planes are separated between a bank of receivers and transmitters which are cross-connected for effectuating the loop-back functionality.

In the exemplary embodiment depicted in FIG. 2, pathway 203 is operable as the receive path and wavelength separator/coupler 204A is coupled thereto for facilitating two receiver ports. Receiver 208A is provided to be operable at one wavelength (e.g., in the 1310 band) and receiver 208B is operable at another wavelength (e.g., in the 1550 band). In similar fashion, pathway 203B is provided as the transmit path and wavelength separator/coupler 204B is coupled thereto for facilitating two transmitter ports. Transmitter 210A is operable at about 1310 nm and transmitter 210B is operable at about 1550 nm. Cross-connect pathways for optical loop-back functionality are effectuated by way of signal paths 212 and 214 under the control of the control entity 122 in a manner similar to the cross-connect pathways provided in the transponder embodiment 100 described hereinabove with respect to FIG. 1.

Those skilled in the art should readily recognize that the wavelength cross-mapping scheme 206 may be effectuated by mens of various known optical devices such as, e.g., circulators, filter, splitters, etc., operating to direct radiation at a specific wavelength to a designated path. Paths 216A and 218A are operable in the 1310 band as receive and transmit paths, respectively. Similarly, paths 216B and 218B are provided as receive and transmit paths, respectively, in the 1550 band.

Figure 3:
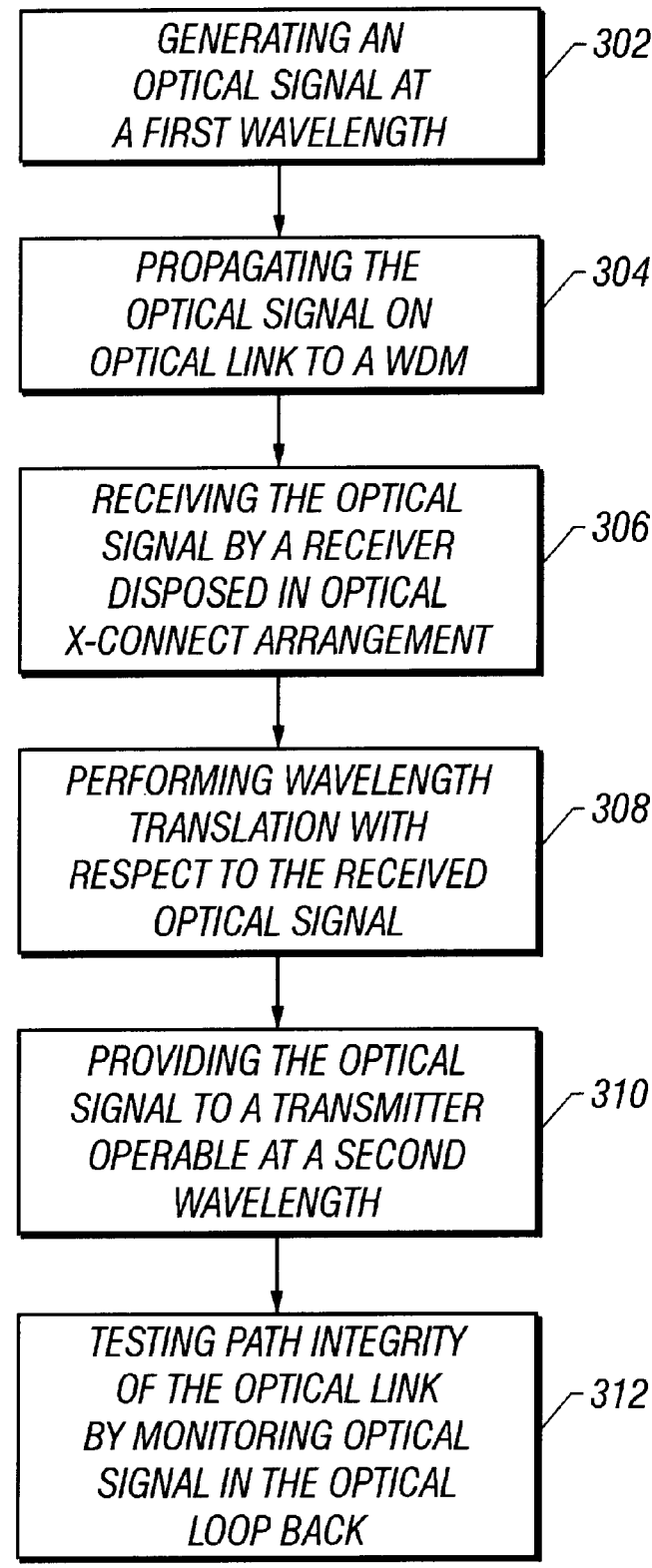
FIG. 3 is a flow chart of the steps involved in an exemplary path monitoring method using the wavelength agile optical transponder system of the present invention.

FIG. 3 is a flow chart of the steps involved in an exemplary method for testing an optical link formed of a single fiber using the wavelength agile optical transponder system of the present invention. Upon generating an optical signal at a first wavelength by an optical source (step 302), the optical signal is propagated on the link via a suitable optical channel to a WDM coupler disposed on the optical link (step 304). The WDM coupler de-multiplexes the incident signal, whereby a receiver disposed in an optical cross-connect arrangement receives the signal for further processing (step 306). Wavelength translation is performed with respect to the received signal, preferably under the control of a suitable control entity (step 308). The optical signal with translated wavelength is provided to a complementary transmitter operating at a second wavelength (step 310) which effectuates a loop-back on the optical link. Path integrity of the link with respect to the radiation having the operating wavelengths is tested by monitoring signal power levels, strength and other parameters (step 312). Other functions may also be provided such as, e.g., monitoring and displaying receive power level, transponder input wavelength, selectable control of transmitter output levels, indicating wavelength range of the incident signal, etc.

Based upon the foregoing Detailed Description, it should be readily apparent that the present invention provides an innovative optical transponder solution that advantageously overcomes the shortcomings and deficiencies of the conventional techniques for testing WDM-based optical links. By using embedded wavelength de-multiplexor to direct radiation input to an appropriate receiver which, through intelligent supervision, enables a complementary transmitter for wavelength translation, the need for multiple transponders (each operating a predetermined wavelength) is obviated. Moreover, the present solution allows an operator to test a single bi-directional optical link with a single test device without having to know the wavelength of the incident signal and/or direction of transmission. Automatic rate adaption to accommodate multiple carrier transmission rates is also advantageously provided.

Further, it is believed that the operation and construction of the present invention will be apparent from the foregoing Detailed Description. While the method and apparatus shown and described have been characterized as being preferred, it should be readily understood that various changes and modifications could be made therein without departing from the scope of the present invention as set forth in the following claims.

What is claimed is:

1. An optical transponder system for testing bi-directional transmission in an optical fiber, comprising:

at least one optical source operably coupled to said optical fiber for emanating an optical signal at a first wavelength;

a wavelength division multiplex (WDM) coupler disposed on said optical fiber, said WDM coupler for multiplexing and de-multiplexing optical signals operating at a plurality of wavelengths; and an optical cross-connect portion coupled to said WDM coupler, said cross-connect portion operating to provide said optical signal received by a receiver at said first wavelength on said optical fiber to a transmitter operable for transmitting said optical signal at a second wavelength on said optical fiber, whereby an optical loop-back is effectuated for monitoring integrity of said optical fiber.

2. The optical transponder system for testing bi-directional transmission in an optical fiber as set forth in claim 1, wherein said optical cross-connect portion is comprised of a plurality of optical power splitters.

3. The optical transponder system for testing bi-directional transmission in an optical fiber as set forth in claim 2, wherein said optical power splitters are 3 dB splitters operable to provide receiver and transmitter ports.

4. The optical transponder system for testing bi-directional transmission in an optical fiber as set forth in claim 2, further comprising a processor for at least controlling wavelength translation with respect to said optical signal.

5. The optical transponder system for testing bi-directional transmission in an optical fiber as set forth in claim 2, further comprising a receive power level display.

6. The optical transponder system for testing bi-directional transmission in an optical fiber as set forth in claim 2, further including a display for said optical signal's wavelength.

7. The optical transponder system for testing a fiber optic link bi-directional transmission in an optical fiber in claim 2, wherein said first wavelength is operable in a 1310 nm band.

8. The optical transponder system for testing bi-directional transmission in an optical fiber as set forth in claim 2, wherein said first wavelength is operable in a 1550 nm band.

9. The optical transponder system for testing bi-directional transmission in an optical fiber as set forth in claim 2, wherein said second wavelength is operable in a 1310 nm band.

10. The optical transponder system for testing bi-directional transmission in an optical fiber as set forth in claim 2, wherein said second wavelength is operable in a 1550 nm band.

11. The optical transponder system for testing bi-directional transmission in an optical fiber as set forth in claim 2, further including a controller for controlling transmitter output level.

12. The optical transponder system for testing bi-directional transmission in an optical fiber as set forth in claim 2, wherein said at least one optical source is operable to transmit said optical signal at an Optical Carrier (OC)-3 transmission rate.

13. The optical transponder system for testing bi-directional transmission in an optical fiber as set forth in claim 2, wherein said at least one optical source is operable to transmit said optical signal at an OC-12 transmission rate.

14. The optical transponder system for testing bi-directional transmission in an optical fiber as set forth in claim 2, wherein said at least one optical source is operable to transmit said optical signal at an OC-48 transmission rate.

15. A method of testing an optical link formed of a single fiber, comprising the steps of:
generating an optical signal at a first wavelength by an optical source disposed on said single fiber;
propagating said optical signal on said optical link towards a wavelength division multiplex (WDM) coupler disposed on said single fiber;
receiving said optical signal by a receiver disposed in an optical cross-connect arrangement coupled to said WDM coupler;
performing wavelength translation with respect to said received optical signal;
providing said optical signal to a transmitter operating at a second wavelength and transmitting said optical signal over said single fiber effectuating an optical loop-back; and
monitoring path integrity of said optical link by evaluating said optical signal in said optical loop-back.

16. The method of testing an optical link formed of a single fiber as set forth in claim 15, wherein said optical source is operable at a plurality of wavelengths.

17. The method of testing an optical link formed of a single fiber as set forth in claim 15, wherein said first wavelength is operable in a 1310 nm band.

18. The method of testing an optical link formed of a single fiber as set forth in claim 13, wherein said first wavelength is operable in a 1550 nm band.

19. The method of testing an optical link formed of a single fiber as set forth in claim 15, wherein said second wavelength is operable in a 1310 nm band.

20. The method of testing an optical link formed of a single fiber as set forth in claim 15, wherein said second wavelength is operable in a 1550 nm band.

21. The method of testing an optical link formed of a single fiber as set forth in claim 15, wherein said optical source is operable to transmit said optical signal at an Optical Carrier (OC)-3 transmission rate.

22. The method of testing an optical link formed of a single fiber as set forth in claim 15, wherein said optical source is operable to transmit said optical signal at an OC-12 transmission rate.

23. The method of testing an optical link formed of a single fiber as set forth in claim 15, wherein said optical source is operable to transmit said optical signal at an OC-48 transmission rate.

24. The method of testing an optical link formed of a single fiber as set forth in claim 15, wherein said step of performing a wavelength translation is controlled by a microprocessor.

25. The method of testing an optical link formed of a single fiber as set forth in claim 15, further comprising the step of displaying a receive power level associated with said optical signal.

26. The method of testing an optical link formed of a single fiber as set forth in claim 15, further comprising the step of controlling transmitter output level associated with said optical signal.

27. The method of testing an optical link formed of a single fiber as set forth in claim 15, further comprising the step of displaying a wavelength range associated with said optical signal received by said receiver.

28. The method of testing an optical link formed of a single fiber as set forth in claim 15, wherein said optical cross-connect arrangement is implemented using at least one optical power splitter.

29. The method of testing an optical link formed of a single fiber as set forth in claim 28, wherein said at least one optical power splitter comprises a 3 db splitter operable to provide receiver and transmitter ports.

* * * * *